(12) United States Patent
Eguchi (10) Patent No.: US 9,598,132 B2
(45) Date of Patent: Mar. 21, 2017

(54) FRAME STRUCTURE FOR ELECTRIC MOTORCYCLE AND SUPPORT STRUCTURE FOR ELECTRIC MOTOR

(71) Applicant: SUZUKI MOTOR CORPORATION, Hamamatsu-shi, Shizuoka (JP)

(72) Inventor: Teppei Eguchi, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 0 days.

(21) Appl. No.: 14/528,713

(22) Filed: Oct. 30, 2014

(65) Prior Publication Data
US 2015/0122568 A1   May 7, 2015

(30) Foreign Application Priority Data

Nov. 5, 2013  (JP) .................................. 2013-229490
Nov. 5, 2013  (JP) .................................. 2013-229491

(51) Int. Cl.
| | |
|---|---|
| B62J 1/08 | (2006.01) |
| B62K 11/04 | (2006.01) |
| B62H 1/02 | (2006.01) |
| B62K 25/04 | (2006.01) |
| B62K 19/12 | (2006.01) |

(52) U.S. Cl.
CPC ................ *B62K 11/04* (2013.01); *B62H 1/02* (2013.01); *B62J 1/08* (2013.01); *B62K 19/12* (2013.01); *B62K 25/04* (2013.01); *B62K 2204/00* (2013.01)

(58) Field of Classification Search
CPC ........ B62K 11/04; B62K 19/12; B62K 25/04; B62H 1/02; B62J 1/08
See application file for complete search history.

(56) References Cited

U.S. PATENT DOCUMENTS

| | | | | |
|---|---|---|---|---|
| 4,139,072 | A * | 2/1979 | Dawson ............... | B60K 15/063 180/219 |
| 4,440,412 | A * | 4/1984 | Kamiya ................ | B62K 11/04 180/231 |
| 8,225,897 | B1 * | 7/2012 | Hollingsworth ....... | B62K 11/04 180/219 |
| 8,960,355 | B2 | 2/2015 | Matsuda ...................... | 180/65.1 |
| 9,085,342 | B2 * | 7/2015 | Jauvtis ..................... | B62M 6/55 |
| 9,238,495 | B2 | 1/2016 | Matsuda ...................... | 180/220 |

(Continued)

FOREIGN PATENT DOCUMENTS

| | | |
|---|---|---|
| CN | 102464071 A | 5/2012 |
| CN | 102556237 A | 7/2012 |

(Continued)

OTHER PUBLICATIONS

Chinese Office Action dated Jun. 23, 2016, issued by the Chinese Patent Office in corresponding application CN 201410617634.1.

(Continued)

*Primary Examiner* — Anne Marie Boehler
*Assistant Examiner* — Gabriela C Craciun
(74) *Attorney, Agent, or Firm* — Stein IP, LLC (57) ABSTRACT

There is provided a frame structure for an electric motorcycle. A plurality of electric components are mounted in a chassis framework comprised of a pair of half-frame bodies. One of the half-frame bodies is formed into a module to which electric components are connected via cables.

9 Claims, 10 Drawing Sheets

(56) References Cited

U.S. PATENT DOCUMENTS

| | | | | |
|---|---|---|---|---|
| 2007/0092764 | A1* | 4/2007 | Kobayashi | B62K 11/04 429/9 |
| 2008/0277980 | A1* | 11/2008 | Koda | B62K 11/04 297/215.16 |
| 2010/0193275 | A1* | 8/2010 | Song | B62K 11/04 180/219 |
| 2012/0103706 | A1 | 5/2012 | Kondo et al. | 180/65.1 |
| 2012/0103716 | A1 | 5/2012 | Fujihara et al. | 180/220 |
| 2013/0026733 | A1* | 1/2013 | Oe | B62K 11/04 280/281.1 |
| 2013/0032424 | A1* | 2/2013 | Sand | B62K 11/04 180/220 |
| 2013/0032427 | A1* | 2/2013 | Ishikawa | B62K 11/04 180/220 |
| 2013/0081894 | A1* | 4/2013 | Ishikawa | B62M 7/04 180/220 |
| 2013/0161107 | A1* | 6/2013 | Tsukamoto | B62K 11/10 180/220 |
| 2013/0256049 | A1* | 10/2013 | Matsuda | B62K 11/06 180/220 |
| 2013/0260595 | A1* | 10/2013 | Tamaki | H01R 13/6272 439/345 |
| 2013/0264134 | A1* | 10/2013 | Matsuda | B60K 1/04 180/68.1 |
| 2013/0270025 | A1* | 10/2013 | Matsuda | B62K 11/04 180/220 |
| 2013/0270938 | A1* | 10/2013 | Matsuda | B60K 1/00 310/54 |
| 2013/0282218 | A1* | 10/2013 | Matsuda | B60L 15/2045 701/22 |
| 2013/0307470 | A1* | 11/2013 | Watanabe | H02J 7/025 320/108 |
| 2014/0262569 | A1* | 9/2014 | Inoue | B62J 9/00 180/65.1 |
| 2014/0292235 | A1* | 10/2014 | Murase | B62K 11/04 318/139 |
| 2014/0305729 | A1* | 10/2014 | Testoni | B62K 11/04 180/220 |
| 2014/0339008 | A1 | 11/2014 | Matsuda | 180/220 |
| 2014/0353061 | A1* | 12/2014 | Iida | B60K 15/07 180/220 |
| 2015/0035249 | A1* | 2/2015 | Toda | B62K 19/12 280/279 |

FOREIGN PATENT DOCUMENTS

| | | |
|---|---|---|
| CN | 2013237717 A | 8/2013 |
| JP | 2006-219081 A | 8/2006 |
| JP | 2013-154859 A | 8/2013 |
| JP | 2013-229491 A | 11/2013 |
| WO | WO 2013/098890 A1 | 7/2013 |

OTHER PUBLICATIONS

Chinese Office Action dated Dec. 21, 2016, issued by the Chinese Patent Office in corresponding application CN 201410617634.1.
German Office Action dated Feb. 1, 2017, issued to German Patent Application No. 102014016101.3.

* cited by examiner

FRAME STRUCTURE FOR ELECTRIC MOTORCYCLE AND SUPPORT STRUCTURE FOR ELECTRIC MOTOR

The disclosure of Japanese Patent Application No. 2013-229490 filed on Nov. 5, 2013 and Japanese Patent Application No. 2013-229491 filed on Nov. 5, 2013, including specifications, drawings and claims is incorporated herein by reference in its entirety.

TECHNICAL FIELD

The invention relates, in general, to a frame structure for an electric motorcycle and, more particularly, to a frame structure for an electric motorcycle in which main components are connected together by means of high voltage cables.

The invention relates, in general, to a support structure for an electric motor and, more particularly, to a support structure for supporting an electric motor on a chassis framework made of cast aluminum.

BACKGROUND

Conventionally, a chassis of an electric motorcycle has been known, which accommodates an electric component, such as a battery, or the like, which requires a relatively-wide mounting space (see Japanese Patent Application Publication No. 2006-219081). The chassis disclosed in Japanese Patent Application Publication No. 2006-219081 is provided with a mounting space defined by left and right half-frame parts and having on the lateral side thereof an opening through which the mounting space is exposed to the outside. Electric components are mounted into the mounting space through the opening in a state of being stored in an expandable accommodating casing. When the electric component is mounted, through the opening on the half-frame part, into the mounting space in a state of being stored in the accommodating casing, which is larger than the opening, it is possible to insert the accommodating casing into the mounting space of the chassis by making the accommodating casing contracted.

Main components, such as an electric motor, an inverter, a controller, and the like, are mounted in the chassis of an electric motorcycle. Since heavy current flows through such components, components are connected together by means of thick high voltage cables, which are, however, uneasy to mount. Further, since the electric motorcycle is provided with a plurality of sensors and switches, and a main harness has a complicated structure, the electrical wirings are complicated. Furthermore, currently-available electric motorcycles are required to be made lighter and smaller, so it is expected that, in the future, the mounting space in the chassis be reduced. Because of this, in the above-mentioned chassis structure in which electric components are to be mounted in a state of left and right half-frame parts being bonded together to form the chassis structure, it is difficult to mount the wirings.

Conventionally, a scooter-type electric motorcycle includes an electric motor on the side of a rear wheel attached to a rear swing arm connected to a chassis framework (see Japanese Patent Application Publication No. 2013-154859). In the electric motorcycle disclosed in Japanese Patent Application Publication No. 2013-154859, a pivot plate is provided onto a chassis framework, and a rear swing arm is connected such that it is vertically movable about a pivot axis of the pivot plate. Further, a side kickstand is attached to the pivot plate below the pivot axis. When the side kickstand flips down and makes contact with the ground, the electric motorcycle is kept upright for itself. Like this, for the scooter-type electric motorcycle, the attachment position of the side kickstand is separated from the electric motor.

For other type electric motorcycles, however, the electric motor is supported at a position in proximity to a pivot of the chassis framework. In order to allow the electric motor to be supported by the chassis framework, it is required to support an output shaft of the electric motor at three or more points around the output shaft so as to counteract a reaction against a driving force applied to the output shaft. Because of this, a problem arises in that the electric motor cannot be stably supported unless a section is used to support the electric motor throughout a wide lateral side area of the chassis framework.

Further, a bracket for a side kickstand is attached to the chassis framework in proximity to the support position of the electric motor. This bracket is formed from a forged material harder than the chassis framework, since it is subjected to a local load at a position close to a rotary shaft of the side kickstand. Therefore, since the chassis framework should include the attachment position of the bracket for a side kickstand, the chassis framework has a limited area to support the electric motor.

SUMMARY

It is therefore an object of the present invention to provide a frame structure for an electric motorcycle which is capable of improving the mounting of electric components and the wiring therebetween.

Another object of the present invention to provide a support structure for an electric motor, which is capable of stably supporting the electric motor while securing the attachment position of a bracket for a side kickstand.

In order to solve the problem, the present invention provides a frame structure for an electric motorcycle in which a plurality of electric components are mounted in a chassis framework comprised of a pair of half-frame bodies, wherein one of the half-frame bodies is formed into a module to which electric components are connected via cables.

According to this configuration, since one of the half-frame bodies and the plurality of electric components are formed into a module, when the half-frame bodies in a pair are coupled together, the plurality of electric components can be easily mounted in the chassis framework. Since the electric components and the wiring are mounted onto one of the half-frame bodies before the pair of half-frame bodies is coupled, the wiring between the electric components can be easily conducted. Further, the mounting of the electric components and the wiring can be conducted in a narrowed mounting space in the chassis framework, contributing to the fabrication of a light, small electric motorcycle.

In the frame structure for an electric motorcycle according to the present invention, the plurality of electric components may include an electric motor, an inverter, and a controller. In this configuration, since heavy current flows through the electric motor, the inverter, and the controller, the electric components are connected together by means of thick high voltage cables which are uneasy-to-install. However, since the mounting of the high voltage cables is carried out when the pair of half-frame bodies is in an open state, the wiring can be easily conducted.

In the frame structure for an electric motorcycle according to the present invention, a seat rail comprised of a pair of rail members and a swing arm comprised of a pair of half-arm bodies are mounted in the chassis framework, wherein one of the half-frame bodies is formed into a module to which one of the rail members, one of the half-arm bodies, and a rear suspension are connected, in addition to the electric components, and the other half-frame body is formed into a module to which the other rail member and the other half-arm body are mounted. According to this configuration, when the pair of modular half-frame bodies is coupled, the seat rail, the swing arm, and the rear suspension can be easily mounted to the chassis framework, in addition to the electric components.

In the frame structure for an electric motorcycle according to the present invention, the pair of half-frame bodies is coupled, with a head pipe interposed therebetween. According to this configuration, since the pair of half-frame bodies and the head pipe are discrete elements, the head pipe is not required to be separately formed onto respective half-frame bodies in a single-piece body. Therefore, there is no need for the head pipe to be machined after the pair of half-frame bodies is coupled as in the case where the pair of half-frame bodies is coupled to form the head pipe.

In the frame structure for an electric motorcycle according to the present invention, one of the half-frame bodies in a pair is formed into a module to which electric components are connected, so that the mounting of the electric components and the wiring between the electric components in the chassis frame can be easily conducted.

According to the present invention, a support structure for an electric motor provided on a chassis framework, wherein a bracket for a side kickstand is attached to the chassis framework, and wherein the electric motor is supported by the chassis framework and the bracket at three or more points around an output shaft of the electric motor.

According to this configuration, the electric motor is supported by the bracket for a side kickstand as well as the chassis framework, so that the electric motor can be supported at three or more points around the output shaft even when the lateral side of the chassis framework is made smaller. Accordingly, the electric motor can be stably supported by the chassis framework and the bracket. Further, since the bracket for a side kickstand as a portion of the chassis framework serves as a support position for the electric motor, the support position for the electric motor in the chassis framework is not limited with the provision of the bracket. Further, since the bracket for a side kickstand serves as the support position for the electric motor, it is not required to separately prepare a support member for the electric motor, thereby reducing the number of parts.

In the support structure for an electric motor, the electric motor and the bracket are bolt-fastened from the inside of the chassis framework. According to this configuration, bolt heads are positioned inside of and covered with the chassis framework and the bracket, thereby improving the appearance.

In the support structure for an electric motor, the electric motor is positioned at a substantially middle portion between a front wheel and a rear wheel, and the side kickstand is rotatably attached to a lower portion of the bracket. According to this configuration, since the side kickstand is positioned at a lower central portion of the motorcycle, maneuverability and stability are improved owing to centralized and lowered mass.

In the support structure for an electric motor, the attachment position of the bracket on the chassis framework is in a projected surface of the electric motor, and is positioned below the center of pivot. According to this configuration, since the bracket is in the projected surface of the electric motor, the support position of the bracket can be located in proximity to the chassis framework. Accordingly, the support position of the bracket for the electric motor comes close to the chassis framework, thereby forming a compact, light chassis framework.

In the support structure for an electric motor, a rear edge of the chassis framework is positioned in proximity to the attachment position of the bracket so that the bracket is exposed to the outside. According to this configuration, the lateral side of the chassis framework is made smaller, contributing to the formation of a compact, light chassis framework.

In the support structure for an electric motor, the chassis framework is formed from a cast material, and the bracket is formed from a forged material. According to this configuration, since a portion of the electric motor is supported by the bracket made of a forged material mechanically harder than the chassis framework made of a cast material, the electric motor can be more stably supported.

In the support structure for an electric motor according to the present invention, the electric motor is supported by the chassis framework and the bracket for a side kickstand, so that the electric motor can be stably supported even when the lateral side of the chassis framework is made smaller.

DETAILED DESCRIPTION OF THE EMBODIMENTS

First Embodiment

The first embodiment of the present invention will now be described in detail with reference to the accompanying drawings.

Figure 1:
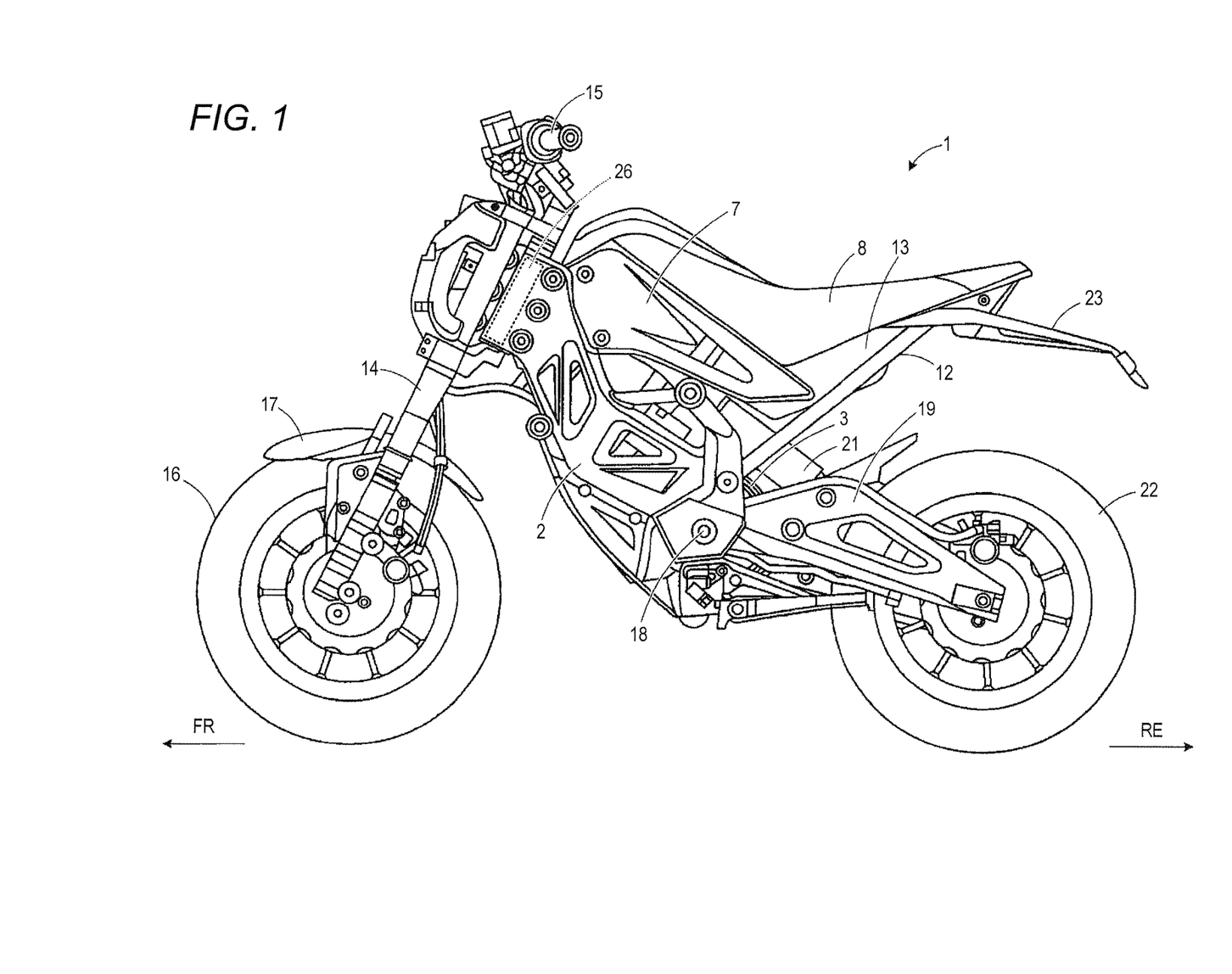
FIG. 1 is a left side view of an electric motorcycle according to a first embodiment of the present invention.

Although an example of a frame structure for an electric motorcycle to be adapted to an off-road type electric motorcycle will be described hereinbelow, the adaptive object is not limited thereto, but may change. For example, the frame structure may be adapted to other type electric motorcycles. FIG. 1 is a left side view of an electric motorcycle 1 according to the first embodiment of the present invention.

Figure 2:
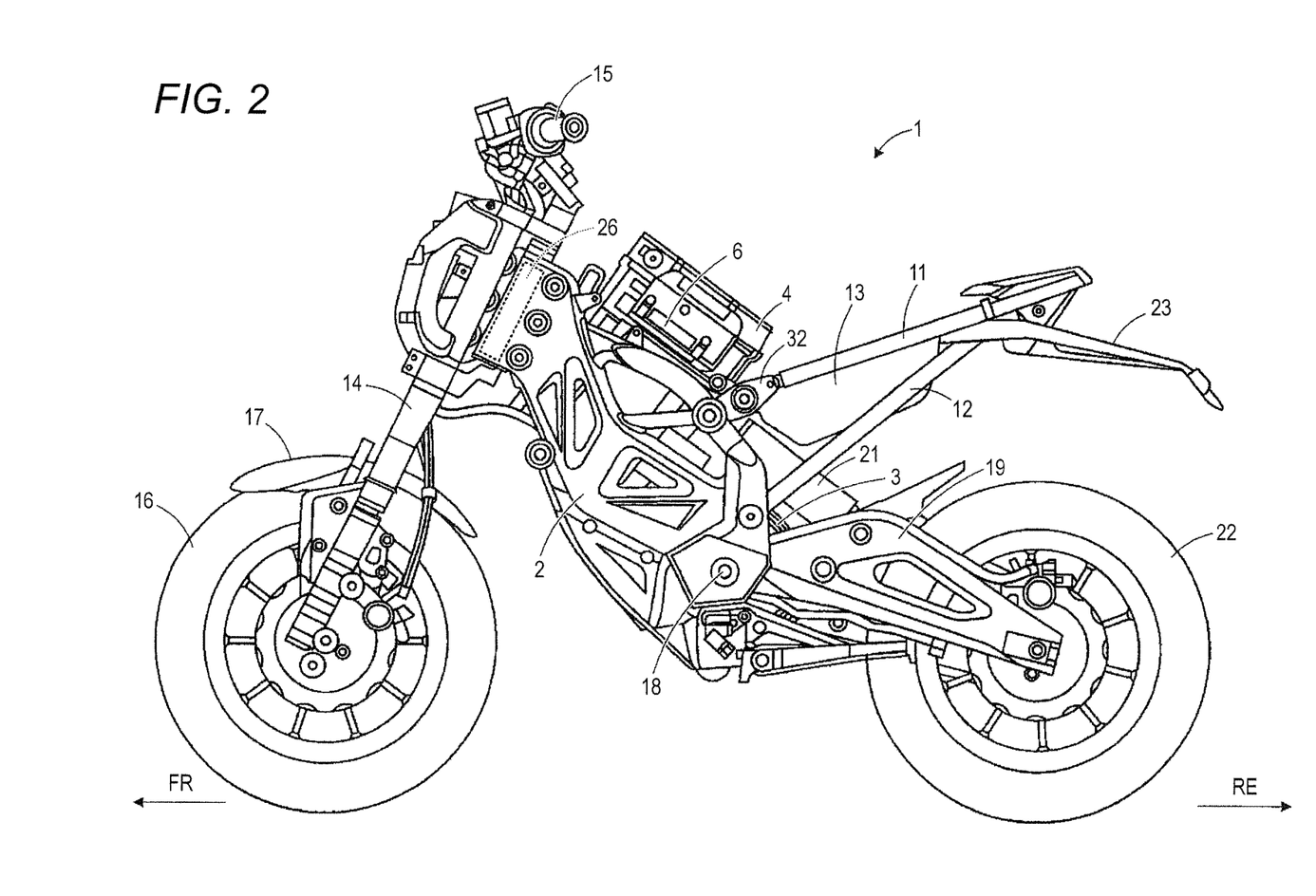
FIG. 2 is a view of the electric motorcycle of FIG. 1 in which a seat and a side cover are removed.
Figure 3:
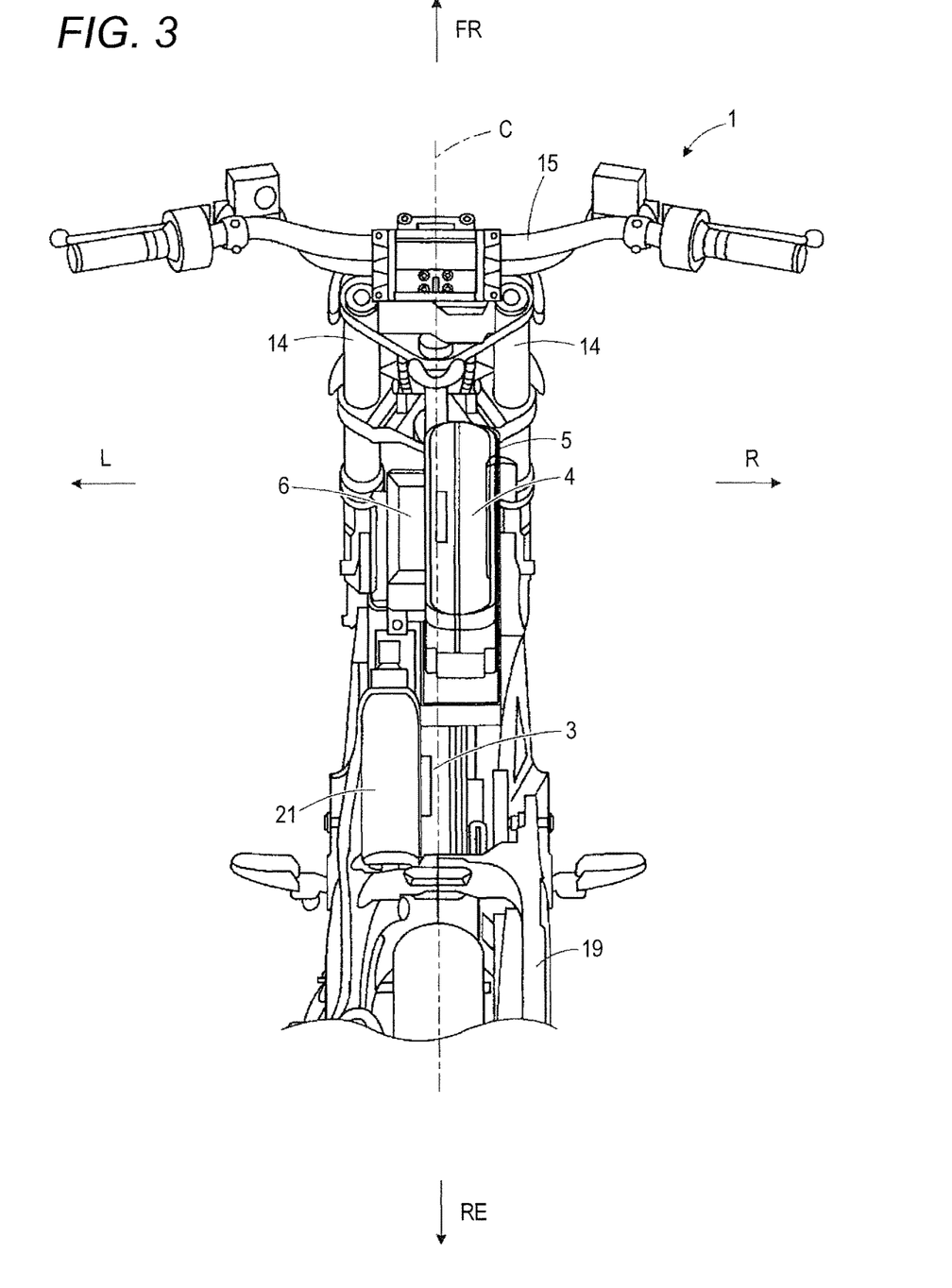
FIG. 3 is an oblique-top view of the electric motorcycle in which a chassis framework is removed.

FIG. 2 is a view of the electric motorcycle 1 of FIG. 1 in which a seat 8 and a side cover 7 are removed. FIG. 3 is an oblique-top view of the electric motorcycle 1 in which a chassis framework 2 according to the first embodiment of the present invention is removed. In the meantime, arrows FR, RE, L, and R respectively denote a front side, a rear side, a left side, and a right side of a chassis throughout the drawings.

As shown in FIGS. 1 and 2, the electric motorcycle 1 is provided with a chassis framework 2 made of steel or aluminum alloy to which discrete parts such as a power unit, electric components and the like are mounted. The chassis framework 2 is divided into two sections from a head pipe 26 located at a front end thereof and extends obliquely downward towards the rear side thereof. An electric motor 3 and a battery 4 are attached to the inside of the chassis framework 2. The battery 4 may be e.g. a lithium-ion battery, and is attached to the chassis framework 2, with a lower-half portion thereof stored in a battery box 5 (see FIG. 3). A controller 6 is fixed to the inside of the battery box 5 so as to control the drive of the electric motor 3.

A side cover 7 is attached to the chassis framework 2 to cover the upper portion of the chassis framework 2 to improve an appearance. A seat 8 is disposed over the side cover 7. A portion of the battery 4 exposed to the outside from the chassis framework 2 is to be covered by the side cover 7 and the seat 8. The seat 8 is supported by a pair of left and right seat rails 11 extending obliquely upwardly in the rearward direction from the rear side of the chassis framework 2. A pair of left and right side frames 12 is attached to the rear side of the chassis framework 2 in order to support the left and right seat rails 11 at lower portions thereof. An inverter 13 is attached to the seat rails 11.

On the front side of the chassis framework 2, a pair of left and right front forks 14 is attached to the head pipe 26 in a steerable manner by means of a steering shaft (not shown). The front forks 14 are provided with front suspensions for shock-absorption of a front wheel, by which shocks from the front wheel 16 are not transferred to the chassis framework 2. A handle 15 is attached to the upper side of the front forks 14. The front wheel 16 is rotatably supported by the front forks 14 at their lower portions. A front fender 17 is provided over the front wheel 16 to cover it.

On the rear side of the chassis framework 2, a swing arm 19 is vertically movably connected to a pivot center 18. A rear suspension 21 for shock-absorption of a rear wheel is attached between the chassis framework 2 and the swing arm 19, in order to absorb shock between the chassis framework 2 and the rear wheel 22. The rear wheel 22 is rotatably supported by the swing arm 19 at its rear side, and a rear fender 23 is provided to the rear side of the seat rail 11 so as to over the upper portion of the rear wheel 22. Power from an output shaft of the electric motor 3 is transmitted to the rear wheel 22 via a chain or the like.

As shown in FIG. 3, the rear suspension 21 is provided on the left side with respect to the central line C extending in the longitudinal direction of the chassis, and the battery 4 is provided on the right side with respect to the central line C. Further, the electric motor 3 is provided below the rear suspension 21 and the battery 4 along the central line C. Since the rear suspension 21 and the battery 4, which are heavy-weight components, are proportionally arranged in the widthwise direction, and the electric motor, which is also a heavy-weight component, is arranged at the center in the widthwise direction, a weight of the motorcycle body is substantially balanced in the widthwise direction, thereby improving steering stability.

Returning again to FIG. 2, in the electric motorcycle 1, the electric motor 3 is power-supplied from the battery 4 via the inverter 13, and the controller 6 controls the drive of the electric motor 3. Since heavy current flow through the main components, such as the inverter 13, the electric motor 3, the controller 6, and the like, the main components are connected together by means of high voltage cables. Since high voltage cables are thick and uneasy-to-bend, it is difficult to mount and wire the main components from the outside of the chassis framework 2. Further, the electric motorcycle 1 is provided with a variety of sensors and switches, the wiring between the controller 6 and the sensors or switches is complicated.

Figure 4:
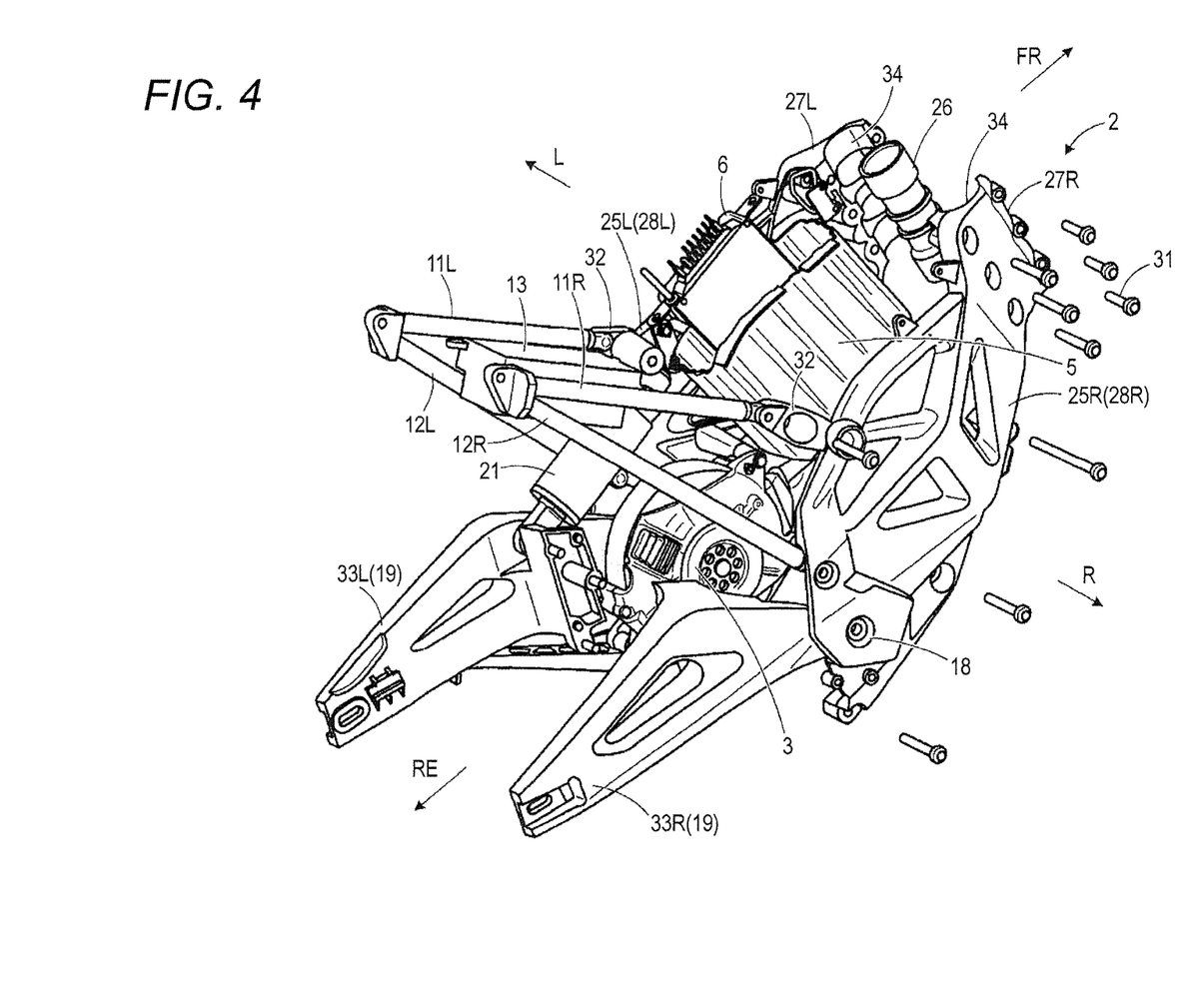
FIG. 4 is an exploded perspective view of a modular half-frame body in which a chassis framework is disassembled.

Accordingly, the first embodiment configures the chassis framework 2 to be comprised of a pair of left and right half-frame bodies 25L and 25R (FIG. 4). In addition, before assembly, the half-frame bodies are formed into modules (sub-assembly) by mounting or wiring components thereto, and then the modular half-frame bodies are assembled together. This leads to easy mounting or wiring of components in the chassis framework 2. The mounting and wiring operations for the chassis framework will now be described with respect to FIGS. 4 and 5.

Figure 5:
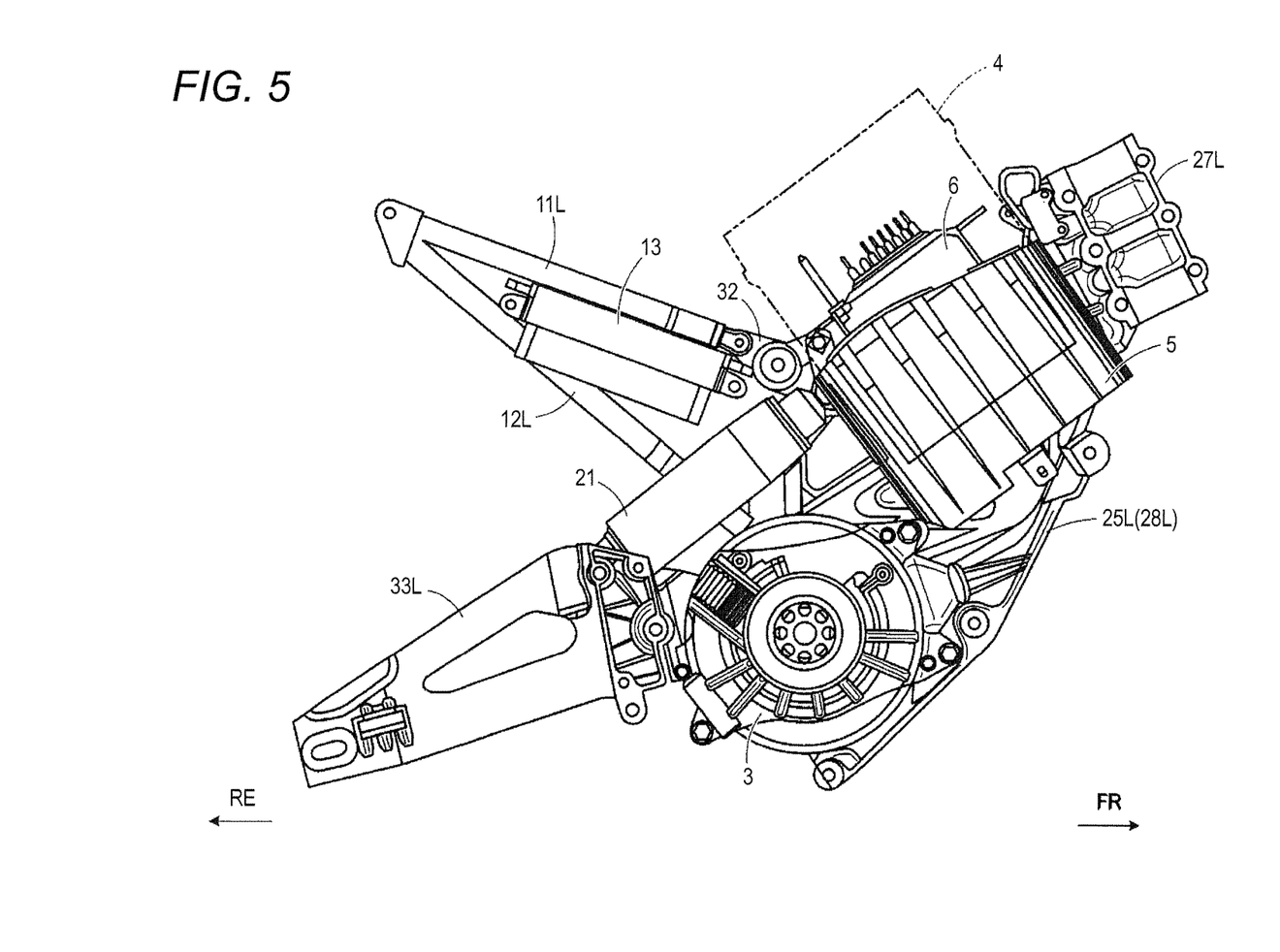
FIG. 5 is a side view showing the medial portion of a left half-frame body.

FIG. 4 is an exploded perspective view of the chassis framework 2 according to the first embodiment. FIG. 5 is a side view of the left half-frame body 25L according to the first embodiment. Although FIGS. 4 and 5 illustrate that a variety of electric components are mounted to the left half-frame body 25L, the present invention is not limited thereto. The electric components may be mounted to the right half-frame body 25R. Further, in FIG. 5, the battery 4 is indicated by two-dot chain line.

As shown in FIG. 4, the chassis framework 2 is comprised of a pair of left and right half-frame bodies 25L and 25R, which is to be assembled together. The half-frame bodies 15L, 25R are provided with head frame parts 27L, 27R, which hold the head pipe 26 which is a unitary body, and main frame parts 28L, 28R extending from the head frame parts 27L, 27R toward the middle portion of the electric motorcycle. The head frame parts 27L, 28R are provided with semi-cylindrical recesses 34 that correspond to the external shape of the head pipe 26. The half-frame bodies 25L, 25R and the head pipe 26 are integrally assembled by bolt 31—connecting the head frame parts 27L, 27R together while the head pipe 26 is fitted into the recesses 34.

The main frame parts 28L, 28R are main elements that form the greater part of the chassis framework 2. When the main frame parts 28L, 28R are assembled together by means of a plurality of bolts 31, a mounting space is formed therein to accommodate a variety of components. The mounting space is closed at the front side in the vertical direction, and is opened at the upper side in the rearward direction. The battery box 5 equipped with the controller 6 is attached to a substantially front half section of the left main frame part 28L. A battery 4 (see FIG. 5) is stored in the battery box with an upper portion thereof exposed to the outside from the battery box. The electric motor 3 is attached to a substantially rear half section of the left main frame part 28L.

A bracket 32 is provided on the left main frame part 28L in a protruded manner, and the seat rail 11L is attached to the bracket 32. The seat rail 11L is reinforced, at its lower portion, by the side frame 12L attached to the left main frame part 28L. Further, the swing arm 19 is comprised of a pair of half-arm bodies 33L, 33R, wherein the left half-arm body 33L is connected to the left main frame part 28L in a shakable manner. Further, the left main frame part 28L and the left half-arm body 33L are connected together by the rear suspension 21.

The left main frame part 28L is formed into a module by attaching the controller 6, the battery box 5, the electric motor 3, the inverter 13, the seat rail 11L, the side frame 12L, the half-arm body 33L, and the rear suspension 21 thereto. In the meantime, the right main frame part 28R is formed into a module by attaching the seat rail 11R, the side frame 12R, and the half-arm body 33R thereto, opposite the configuration of the left main frame part 28L. The chassis framework 2 can therefore be formed by simply assembling the pair of left and right modular half-frame bodies.

As shown in FIG. 5, the top-opened battery box 5 is mounted to the front-half side of the left main frame part 28L in such a way as to be inclined rearwards. The controller 6 is attached to the left inner side of the battery box 5, and a storing space for a battery 4 is formed on the right side of the controller 6. A harness for various sensors or switches required for the control of the electric motor 3 is connected to the controller 6 via a main harness. The battery 4 is stored in the battery box 5 in proximity to the controller 6, and supplies power to the controller 6.

The electric motor 3 is mounted to the rear-half side of the left main frame part 28L below the battery box 5. Since the heavy electric motor is attached to the lower portion of the motorcycle body at a substantially middle portion between the front wheel 16 and the rear wheel 22, the center of weight in the motorcycle body is lowered, leading to improved maneuverability and stability. The inverter 13 is mounted to the seat rail 11L extending rearwards from the left main frame part 28L. Like this, to the left main frame part 28L, the controller 6 (battery box 5), the inverter 13, and the electric motor 3 are integrally mounted. Further, the controller 6 (battery box 5), the inverter 13, and the electric motor 3 are connected by means of thick high voltage cables.

The half-arm body 33L is mounted to the pivot center 18 (see FIG. 4) of the left main frame part 28L. The rear suspension 21 is mounted, at its rear side, to a substantially-middle portion of the half-arm body 33L. The front side of the rear suspension 21 is mounted to the main frame part 28L in proximity to the rear side of the battery box 5. The rear suspension 21 is arranged in a space defined by the battery box 5, the electric motor 3, and the inverter 13, leading to efficient utilization of space in the main frame 28.

In this case, the mounting and wiring operations performed on the left half-frame body 25L are carried out before the left half-frame body is assembled to the right half-frame body 25R, i.e. when the pair of half-frame bodies 25L, 25R is in an opened state. Therefore, since the mounting or wiring operation can be carried out in a state where the mounting space of the half-frame body 25L (chassis framework 2) is opened towards the outside, the operation position or access to the operation site is not restricted. Therefore, it is possible to easily perform the mounting or wiring of various components on the half-frame body 25L while reducing operation load. Particularly, the controller 6, the electric motor 3, and the inverter 13 can be easily connected by means of thick, uneasy-to-install high-voltage cables.

Further, since the mounting or wiring operation can be performed while observing the operation site, operation stability can be improved. Moreover, since the mounting space of the chassis framework 2 can be made smaller as much as the mounting or wiring operation is improved, it is possible to produce a light, small electric motorcycle 1.

Further, the chassis framework 2 is formed when the pair of modular half-frame bodies 25L, 25R is assembled together by means of the plurality of bolts 31 (see FIG. 4). Here, since the half-frame bodies 25L, 25R are assembled together while a unitary body of the head pipe 26 is fitted therebetween (see FIG. 4), after the assembly of the pair of half-frame bodies 25L, 25R, it is not required to machine the head pipe 26.

In the meantime, in the case of a conventional left-right divided chassis framework, a head pipe is formed by machining the front side of the chassis framework while the pair of half-frame bodies is in an assembled state. Because of this, in a state where the respective half-frame bodies are formed into modules, to which various components are mounted, before the assembly of the pair of half-frame bodies, it is difficult to machine the head pipe. Therefore, in the case of the conventional left-right divided chassis framework, after the machining of the head pipe in a state of the pair of half-frame bodies being assembled together, the mounting or wiring operation is carried out. In this case, however, it is difficult to perform the mounting or wiring operation, since the mounting or wiring operation should be performed through the open space of the chassis framework after the assembly of the half-frame bodies.

On the contrary, according to the first embodiment, with the provision of a unitary body of head pipe 26, the machining of the head pipe 26 after the assembly of the pair of half-frame bodies 25L, 25R is removed. Therefore, although various components are mounted to the respective half-frame bodies 25L, 25R, thereby forming modules, before the assembly of the pair of half-frame bodies 25L, 25R, such measures do not affect subsequent processes any more. Thus, it is possible to perform the mounting or wiring operation before the assembly of the half-frame bodies 25L, 25R, thereby further facilitating the machining process and therefore reducing the manufacturing cost.

As such, according to the first embodiment, since one of the half-frame bodies 25L, 25R and the plurality of electric components are incorporated into a module, the plurality of electric components can be easily mounted in the chassis framework 2 by assembling the pair of half-frame bodies 25L, 25R together. Here, since the mounting or wiring operation is performed on the left half-frame body 25L before the assembly of half-frame bodies 25L, 25R, the working efficiency can be improved. Further, since the mounting or wiring operation can be conducted while observing the operation site, working stability can be improved. Furthermore, even when the mounting space in the chassis framework 2 is made narrowed, it is possible to carry out the mounting or wiring operation, thereby contributing to the production of a light, small electric motorcycle.

In the meantime, the present invention may be modified into a variety of forms without being limited to the illustrated embodiments. In the illustrated embodiments, the sizes or shapes of the components are not limited to the sizes or shapes illustrated in the drawings, but may be adequately changed within the scope that the effect of the invention affects. In addition, it is possible to adequately modify and implement embodiments without departing from the objective scope of the invention.

For instance, although the electric motor 3, the inverter 13, the controller 6, and the like are mounted to the left half-frame body 25L according to the first embodiment, the present invention is not limited thereto. It is possible to collectively mount the electric components to one 25 of the pair of half-frame bodies 25L, 25R, or otherwise to mount the electric components to the right half-frame body 25R.

Further, although the seat rail 11L, the side frame 12L, the half-arm body 33L, and the rear suspension 21 are mounted, as well as the electric components, to the half-frame body 25L so as to form a module according to the first embodiment, the present invention is not limited thereto. It is possible to form a module by mounting only electric components to the half-frame body 25L.

Further, although the head pipe 26 and the pair of half-frame bodies 25L, 25R are respectively formed as a discrete body according to the first embodiment, the present invention is not limited thereto. The configuration may be such that the machining of the head pipe 26 is not required after the assembly of the pair of half-frame bodies 25L, 25R. For instance, the head pipe 26 may be integrally formed onto any one of the half-frame bodies 25L, 25R in a pair.

As set forth in the foregoing, the present invention provides the effect of facilitating the mounting or wiring operation of respective components in the chassis framework. Particularly, the present invention is applicable to a frame structure for an electric motorcycle in which main components are connected together by means of high voltage cables.

Second Embodiment

Figure 6:
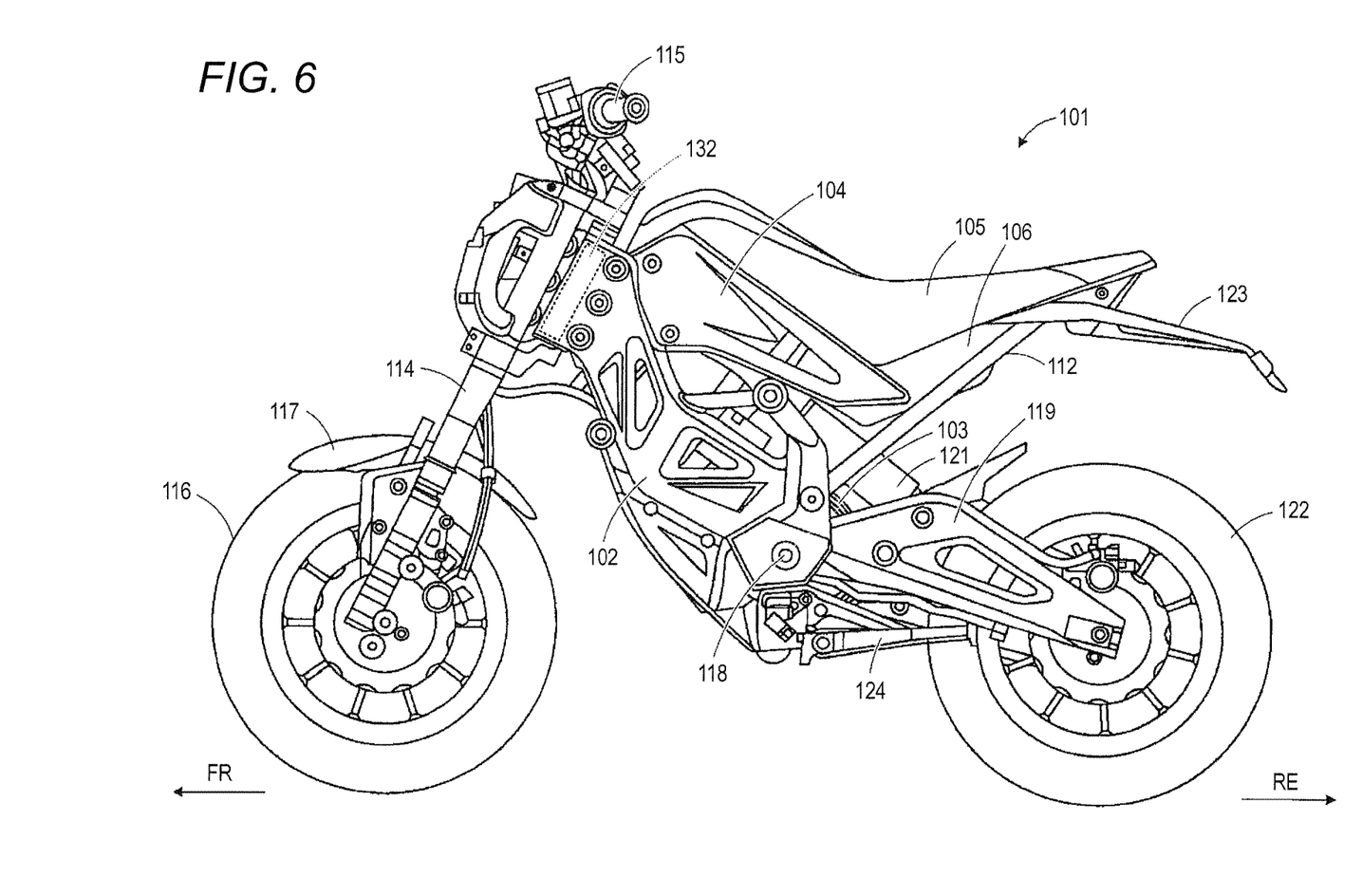
FIG. 6 is a left side view of an electric motorcycle according to a second embodiment of the present invention.

The second embodiment of the present invention will now be described in detail with reference to the accompanying drawings. Although an example of a support structure for an electric motor to be adapted to an off-road type electric motorcycle will be described hereinbelow, the adaptive object is not limited thereto, but may change. For example, the support structure may be adapted to other type electric motorcycles. FIG. 6 is a left side view of an electric motorcycle 100 according to the second embodiment of the present invention. In the meantime, arrows FR, RE, L, and R respectively denote a front side, a rear side, a left side, and a right side of a chassis throughout the drawings.

As shown in FIG. 6, the electric motorcycle 100 is provided with a chassis framework 102 made of steel or aluminum alloy to which discrete parts such as a power unit, electric components and the like are mounted. The chassis framework 102 is divided into two sections from a head pipe 132 located at a front end thereof and extends obliquely downward towards the rear side thereof. A battery 109 (see FIGS. 8A to 8C) and an electric motor 103 are respectively attached to the front and rear sides in the chassis framework 102. A side cover 104 is attached to the chassis framework 102 to cover the upper portion of the chassis framework 102 to improve an appearance. A seat 105 is disposed over the side cover 104.

The seat 105 is supported by a pair of left and right seat rails 111 (see FIGS. 7A and 7B) extending obliquely upwardly in the rearward direction from the rear side of the chassis framework 102. A pair of left and right side frames 112 is attached to the rear side of the chassis framework 102 in order to support the left and right seat rails 111 at lower portions thereof. An inverter 106 is attached to the seat rails 111 in order to convert a DC power from the battery 109 into an AC power. The electric motor 103 is power-supplied from the battery 109 via the inverter 106, and a controller 107 (see FIG. 8C) provided in a battery box 108 (see FIGS. 8A to 8C) controls the drive of the electric motor 103.

On the front side of the chassis framework 102, a pair of left and right front forks 114 is attached to the head pipe 132 in a steerable manner by means of a steering shaft (not shown). The front forks 114 are provided with front suspensions for shock-absorption of a front wheel, by which shocks from the front wheel 116 are not transferred to the chassis framework 102. A handle 115 is attached to the upper side of the front forks 114. The front wheel 116 is rotatably supported by the front forks 114 at their lower portions. A front fender 117 is provided over the front wheel 116 to cover it.

On the rear side of the chassis framework 102, a swing arm 119 is vertically movably connected to a pivot center 118. A rear suspension 121 for shock-absorption of a rear wheel is attached between the chassis framework 102 and the swing arm 119, in order to absorb shock between the chassis framework 102 and the rear wheel 122. The rear wheel 122 is rotatably supported by the swing arm 119 at its rear side, and a rear fender 123 provided on the rear side of the seat 105 covers the upper portion of the rear wheel 122. Power from an output shaft of the electric motor 103 is transmitted to the rear wheel 122 via a chain or the like.

The chassis framework 102 is provided, below the pivot center 118, with a side kickstand 124 which serves to keep the electric motorcycle 101 upright for itself. Since a rotary axis of the side kickstand 124 is applied with a local load, the side kickstand 124 is attached to the chassis framework 102 via a dedicated bracket 141 (see FIGS. 8A to 8C) made of high-strength cast iron or forged aluminum. The electric motor 103 is attached to the chassis framework 102 in proximity to the side kickstand 124. In this case, it is required for the chassis framework 102 to support the output shaft of the electric motor 103 at three or more points around the output shaft. However, if the lateral side of the chassis framework 102 has a small size, it is difficult to secure the support position for the electric motor.

Accordingly, the second embodiment provides a configuration in which in addition to the chassis framework 102, the bracket 141 for a side kickstand 124 (see FIGS. 8A to 8C) is provided with a support section for the electric motor 103, thereby supporting the electric motor 103 at three or more points. Therefore, even when the lateral side of the chassis framework 102 is made smaller, it is possible to stably support the circumference of the electric motor 103 at three or more points. Hereinbelow, the attachment position of the electric motor 103 will be described with reference to FIGS. 7A, 7B, 8A, 8B and 8C.

Figure 7A:
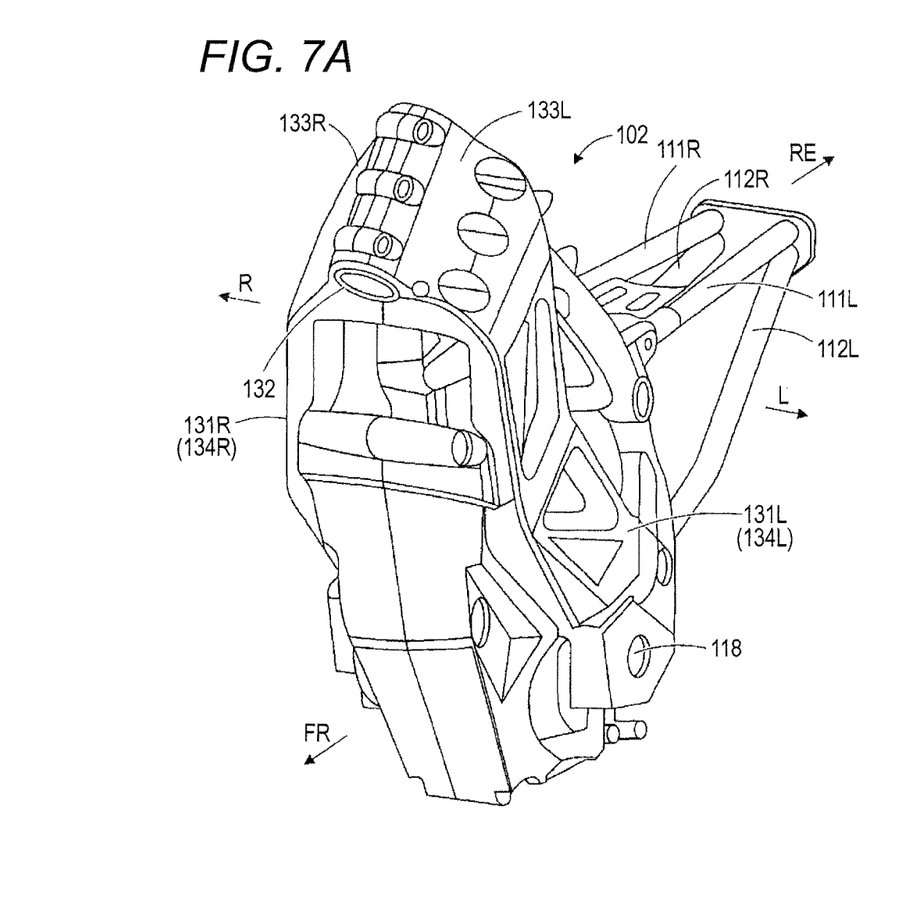
FIGS. 7A and 7B are views showing a chassis framework.
Figure 7B:
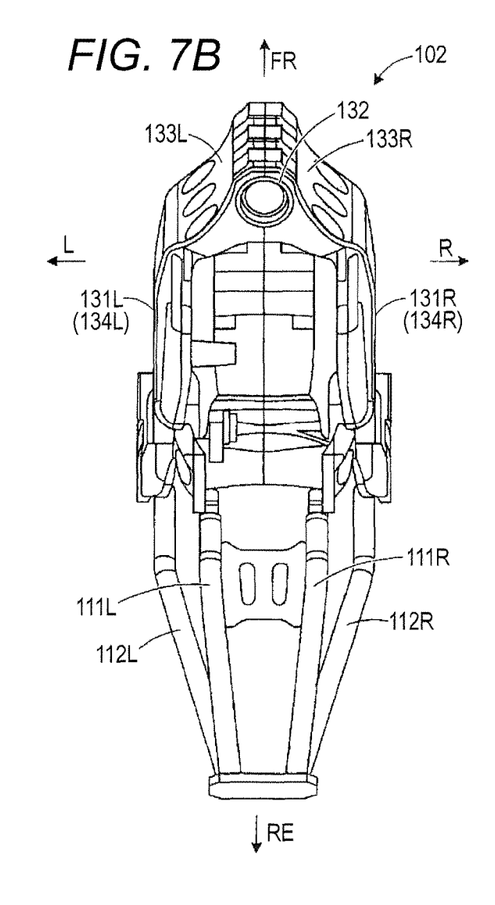
Figure 8A:
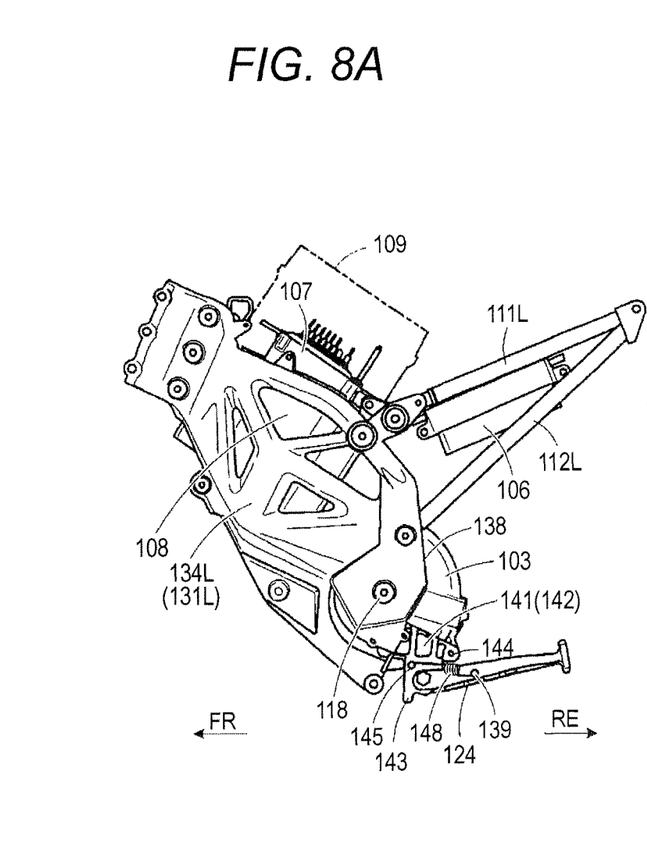
FIGS. 8A to 8C are views showing the attachment position for an electric motor.
Figures 8B, 8C:
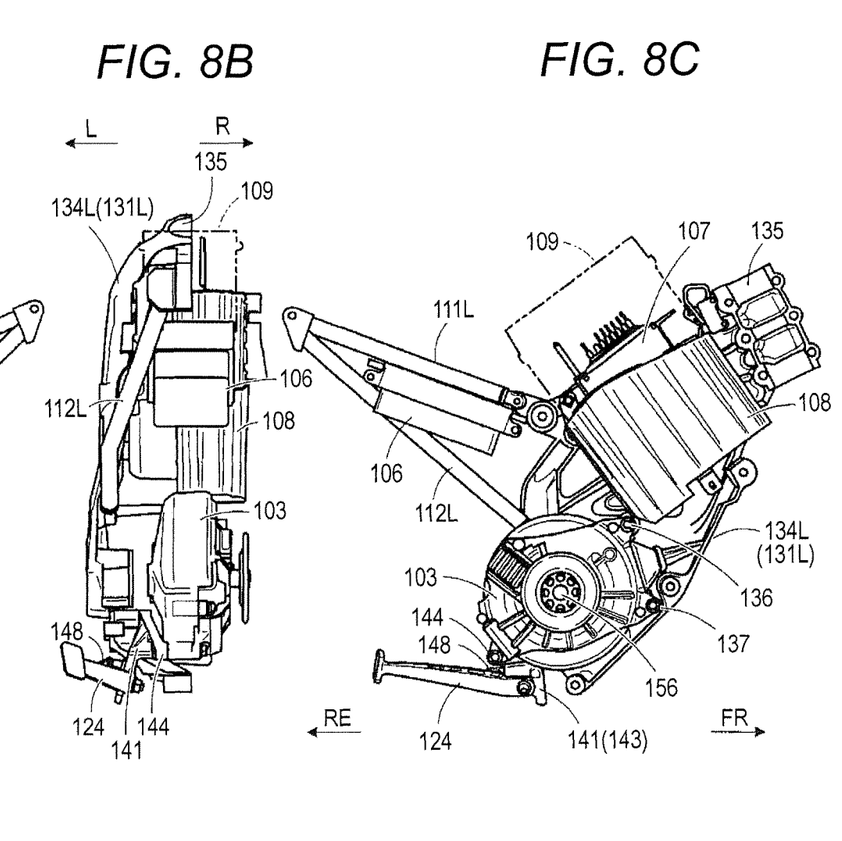

FIGS. 7A and 7B are views showing the chassis framework 102 according to the second embodiment of the present invention. FIGS. 8A to 8C are views showing the attachment position for the electric motor 103 according to the second embodiment of the present invention. In the meantime, FIG. 7A is a perspective view of the chassis framework 102, and FIG. 7B is a top view of the chassis framework 102. Further, FIG. 8A is a left side view of the attachment position for the electric motor 103, FIG. 8B is a rear view of the attachment position for the electric motor 103, and FIG. 8C is a right side view of the attachment position for the electric motor 103. Although FIGS. 8A to 8C illustrate that the electric motor 103 is attached to s left half-frame body 131L, the present invention is not limited thereto. If the side kickstand 124 is provided on the right side of an electric motorcycle, the electric motor 103 may be attached to a right half-frame body 131R. Further, in FIGS. 8A to 8C, the battery 109 is indicated by two-dot chain line.

As shown in FIGS. 7A and 7B, the chassis framework 102 are comprised of a pair of left and right half-frame bodies 131L and 131R, which is to be assembled together. The half-frame bodies 131L, 131R are provided with head frame parts 133L, 133R, which hold the head pipe 132 which is a unitary body, and main frame parts 134L, 134R extending from the head frame parts 133L, 133R towards the rear side of the electric motorcycle. The head frame parts 133L, 133R are provided with semi-cylindrical recesses 135 (see FIG. 8C) that correspond to the external shape of the head pipe 132. The half-frame bodies 131L, 131R and the head pipe 132 are integrally assembled by bolt-connecting the head frame parts 133L, 133R together while the head pipe 132 is fitted into the recesses 135.

The main frame parts 134L, 134R are main elements that form the greater part of the chassis framework 102. When the main frame parts 134L, 134R are assembled together by means of a plurality of bolts, a mounting space is formed therein to accommodate a variety of components. The mounting space is closed at the front side in the vertical direction, and is opened at the upper side in the rearward direction. The seat rails 111L, 111R are attached to the upper sides of the main frame parts 134L, 134R. The seat rails 111L, 111R are reinforced, at their lower portions, by the side frames 112L, 112R attached to the main frame parts 134L, 134R. Further, the periphery of the pivot center 118 of the main frame parts 134L, 134R forms a mounting space for an electric motor 3 (see FIG. 8A).

As shown in FIG. 8A to 8C, a top-opened battery box 108 is mounted to the front-half side of the left main frame part 134L in such a way as to be inclined rearwards. The controller 107 is attached to the left inner side of the battery box 108, and a storing space for a battery 109 is formed on the right side of the controller 107. The battery 109 is stored in the battery box 108 in proximity to the controller 107, and supplies power to the controller 107. The inverter 106 is attached to the seat rail 111L extending rearwards from the left main frame part 134L.

The electric motor 103 is mounted to the rear-half side of the left main frame part 134L below the battery box 108. Since the heavy electric motor 103 is attached to the lower portion of the motorcycle body at a substantially middle portion between the front wheel 116 and the rear wheel 122 (see FIG. 6), the center of weight in the motorcycle body is lowered, leading to improved maneuverability and stability. Like this, to the left half-frame part 131L, electric components including the controller 107 (battery box 108), the inverter 106, and the electric motor 103 are integrally mounted, thereby forming a module. The chassis framework 102 can therefore be formed by simply assembling the right half-frame body 131R onto the left modular half-frame body 131L.

The substantially rear-half side of the electric motor 103 is exposed to the outside in the proximity of the pivot center 118 of the left main frame part 134L. Because of this, the electric motor 103 is supported by the main frame part 134L at two support positions 136, 137 around the substantially front-half side of the electric motor. The bracket 141 for a side kickstand 124 is attached below the pivot center 118 of the main frame part 134L. A rear edge 138 of the main frame part 134L is located in proximity to the attachment position (see FIGS. 9A and 9B) of the bracket 141 so that the bracket 141 is exposed to the outside from the main frame part 134L.

The bracket 141 extends rearwards on the projected surface (profile) of the electric motor 103, and supports the substantially rear-half side of the electric motor 103 at one support position 144 on the leading end thereof. The support position 144 of the bracket 141 is located opposite the two support positions 136 and 137 of the main frame part 134L, with the output shaft 156 of the electric motor 103 disposed therebetween. That is, the electric motor 103 is point-supported by the main frame part 134L (chassis framework 102) and the bracket 141 at the three support positions 136, 137, and 144 around the output shaft 156. Like this, the rear-half side of the electric motor 103 is supported by the bracket extending from the rear edge 138 of the chassis framework 102.

Since the mechanical strength of the bracket 141 is higher than that of the main frame part 134L, even when the width of an arm part 142 extending rearwards from the main frame part 134L is made narrower in the vertical direction, it is possible for the bracket to stably support the electric motor against the chassis framework 102. Further, the side kickstand 124 is rotatably attached to a lower plate 143 on the middle section of the arm part 142 of the bracket 141. A coil spring 148 is connected between respective hooks 139 and 145 of the side kickstand 124 and the plate 143. The side kickstand 124 is returned to its initial position from the ground by means of an elastic force of the coil spring 148.

The bracket 141 is fixed to the main frame part 134L and the electric motor 103 at its base end and leading end, respectively, of the arm part 142. Therefore, the arm part 142 of the bracket 141 is oppositely supported by the main frame part 134L and the electric motor 103, so that the side kickstand 124 can be stably supported by the plate 143.

Figure 9A:
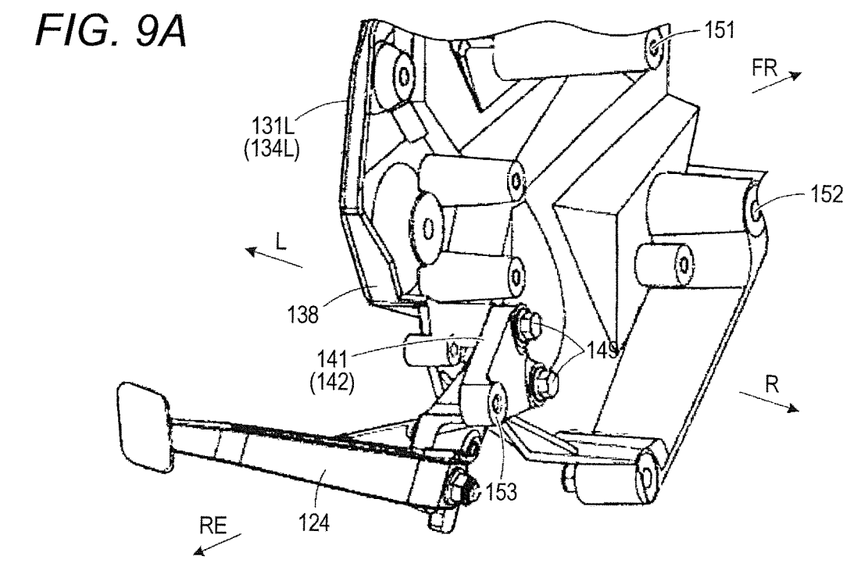
FIGS. 9A and 9B are views showing the attachment position of a bracket.
Figure 9B:
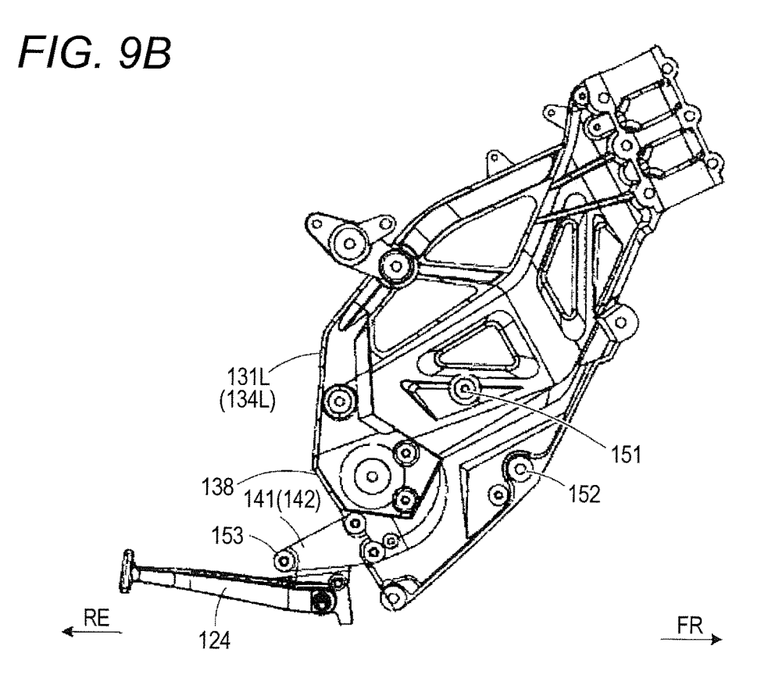
Figure 10A:
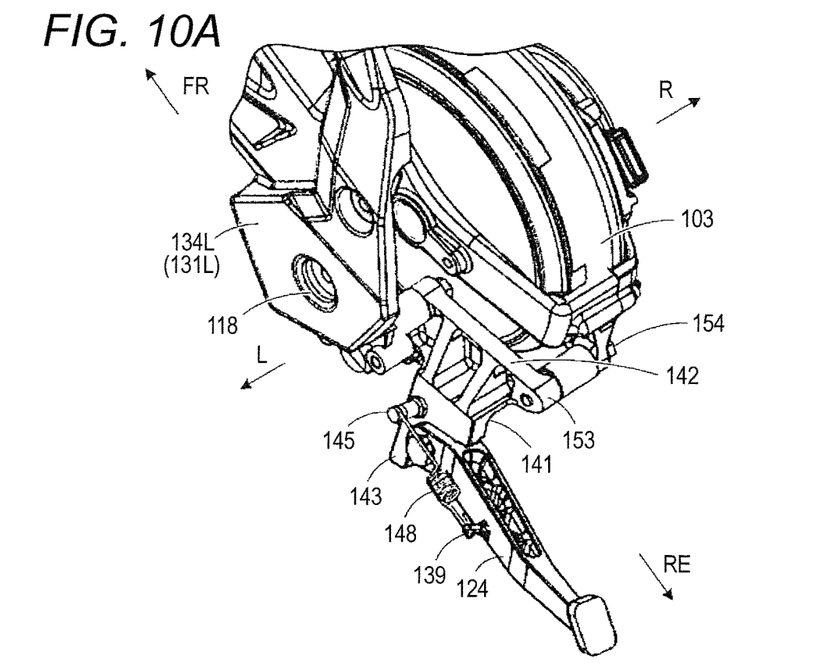
FIGS. 10A and 10B are views showing the attachment position for an electric motor.
Figure 10B:
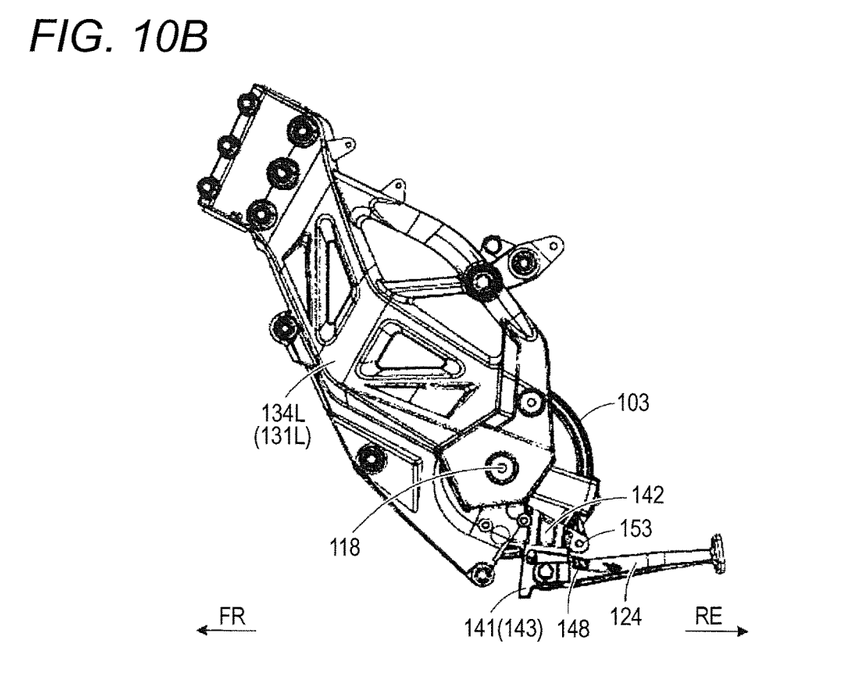

The attachment positions of the bracket 141 and the electric motor 103 for the chassis framework 102 will be described with reference to FIGS. 9A, 9B, 10A and 10B. FIGS. 9A and 9B are views showing the attachment position of the bracket 141 according to the second embodiment. FIGS. 10A and 10B are views showing the attachment position of the electric motor 103 according to the second embodiment. In the meantime, FIGS. 9A and 10A are perspective views showing the periphery of the bracket, and FIGS. 9B and 9B are side views showing the entire chassis framework.

As shown in FIGS. 9A and 9B, the side kickstand 124 is first attached to the main frame part 134L of the left half-frame body 131L via the bracket 141. The bracket 141 is fastened to the periphery of the rear edge 138 of the main frame part 134L by means of bolts 149 at two positions on the base end of the arm part 142. Since the bracket is fastened by the bolts from the inside of the main frame part 134L, bolt heads are located inside of and covered with the main frame part 134L, improving the appearance of the motorcycle. The bracket 141 is supported by the main frame part 134L in a cantilever manner, and extends rearwards from the rear edge 138 of the main frame part 134L.

The main frame part 134L is provided, on the inner surface thereof, with support parts 151 and 152, which are spaced apart in the vertical direction so as to support the front side, rather than the output shaft, of the electric motor 103 (see FIGS. 10A and 10B). Further, the bracket 141 is provided, on the leading end of the arm part 142, with another support part 153 which supports the rear side, rather than the output shaft, of the electric motor 103. The bracket 141 is fastened to the main frame part 134L as such, so that total three support parts 151, 152, and 153 are provided at the two sites on the main frame part 134L and one site on the bracket 141.

Next, as shown in FIGS. 10A and 10B, the electric motor 103 is attached to the support parts 151, 152, and 153 on the main frame part 134L and the bracket 141 (see FIGS. 9A and 9B). The front side of the electric motor 103 is attached to the support parts 151 and 152 of the main frame part 134L, and the rear side of the electric motor 103 is attached to the support part 153 of the bracket 141. Since the electric motor 103 is fastened to the main frame part 134L and the bracket 141 by means of bolts 154 (only one bolt is shown) from the inside thereof, bolt heads are located inside of and covered with the main frame part 134L and the bracket 141, thereby improving the appearance.

Like this, the electric motor 103 is supported by the main frame part 134L and the bracket 141 at three points around the output shaft of the electric motor. Because of this, a reaction against the driving force applied to the output shaft of electric motor is counteracted, thereby stably supporting the electric motor 103. Further, since the arm part 142 of the bracket 141 is positioned in the projected surface of the electric motor 103, the support part 153 of the bracket 141 is positioned in proximity to the main body of the electric motor 103. Therefore, a configuration is embodied such that the support part 153 of the bracket 141 is positioned close to the main frame part 134L, thereby forming a compact, light chassis framework. In this case, since the plate 143 of the bracket 141 extends downwards from the projected surface of the electric motor 103, being exposed to the outside, the side kickstand 124 is out of the coverage of the electric motor 103. Further, since the bracket 141 and the side kickstand 124 are located below the pivot center 118 at the middle portion of the motorcycle, centralized and lowered mass can be obtained.

Since the electric motor 103 is attached to the leading end of the arm part 142 on the bracket 141, the arm part 142 is supported by the main frame part 134L and the electric motor 103 in a cantilever manner. Therefore, the side kickstand 124 is stably supported by the main frame part 134L via the bracket 141. Further, the electric motor 103 is attached to the main frame part 134L with the substantially rear-half side thereof exposed to the outside. Because of this, the lateral side of the main frame part 134L (chassis framework 102) is made smaller, thereby contributing to the formation of a compact, light chassis framework 102. Furthermore, a mold for casting the chassis framework 102 is also made smaller, thereby saving on the cost.

According to the present invention, the electric motor 103 is supported by the bracket 141 for a side kickstand 124 as well as the chassis framework 102, so that the electric motor 103 can be supported at three or more points around the output shaft of the electric motor 103 even when the lateral side of the chassis framework 102 is made smaller. Accordingly, the electric motor 103 can be stably supported by the chassis framework 102 and the bracket 141. Further, since the bracket 141 for a side kickstand 124 as a portion of the chassis framework 102 serves as a support position for the electric motor 103, the support position for the electric motor 103 in the chassis framework 102 is not limited with the provision of the bracket 141. Further, since the bracket 141 for a side kickstand 124 serves as the support position for the electric motor 103, it is not required to separately prepare a support member for the electric motor 103, thereby reducing the number of parts.

In the meantime, the present invention may be modified into a variety of forms without being limited to the illustrated embodiments. In the illustrated embodiments, the sizes or shapes of the components are not limited to the sizes or shapes illustrated in the drawings, but may be adequately changed within the scope that the effect of the invention affects. In addition, it is possible to adequately modify and implement embodiments without departing from the objective scope of the invention.

For instance, although the electric motor 103 is supported by the chassis framework 102 and the bracket 141 for a side kickstand 124 at three or more points according to the second embodiment, the present invention is not limited thereto. The electric motor 103 may be supported by the chassis framework 102 and the side kickstand 124 at three or more points, e.g. four points.

Further, although the electric motor 103 and the bracket 141 are bolt-fastened to the chassis framework 102 from the inside of the chassis framework according to the second embodiment, the present invention is not limited thereto. The electric motor 103 and the bracket 141 may be bolt-fastened to the chassis framework 102 from the outside of the chassis framework.

Further, although the electric motor 103 is bolt-fastened to the chassis framework 102 and the bracket 141 according to the second embodiment, the present invention is not limited thereto. The electric motor 103 may be fastened to the chassis framework 102 and the side kickstand 124 by means of any method, e.g. welding or pressure-fitting.

Further, although the chassis framework 102 is formed from cast aluminum and the bracket 141 is formed from forged iron or aluminum according to the second embodiment, the present invention is not limited thereto. The chassis framework 102 and the bracket 141 may be formed of a same material. For example, the chassis framework 102 and the bracket 141 may be formed from cast aluminum.

Further, although the electric motor 103 is supported by a left/right divided chassis framework 102 and the bracket 141 according to the second embodiment, the present invention is not limited thereto. The electric motor 103 may be supported by a left/right integrated chassis framework 102 and the bracket 141.

As set forth in the foregoing, the support structure of the present invention provides the effect of stably supporting an electric motor while securing the attachment position of a bracket for a side kickstand on a chassis framework, and is particularly useful to support an electric motor on a chassis framework made of cast aluminum.

What is claimed is:

1. A frame structure for an electric motorcycle, comprising a chassis framework comprised of a pair of half-frame bodies,
   wherein an electric motor and an inverter through which a power is supplied from a battery to the electric motor are mounted to one of the half-frame bodies and are connected together via high-voltage cables before assembly of the chassis framework, thereby forming the electric motor, the inverter and the one of the half-frame bodies into one module,
   wherein the one module and another of the half-frame bodies are assembled together to form the chassis framework,
   wherein the electric motor is bolt-fastened from the inside of the chassis framework,
   wherein a periphery of a pivot center of main frame parts of the pair of half-frame bodies forms a mounting space for the electric motor, and
   wherein the electric motor is attached to a rear side of the chassis framework
   wherein a seat rail comprised of a pair of rail members and a swing arm comprised of a pair of half-arm bodies are mounted in the chassis framework,
   wherein one of the rail members, one of the half-arm bodies, and a rear suspension are connected to the one of the half-frame bodies before the assembly of the chassis framework, thereby forming the electric motor, the inverter, the one of the rail members, the one of the half-arm bodies, the rear suspension and the one of the half-frame bodies into the one module,
   wherein another of the rail members and another of the half-arm bodies are mounted to the another of the half-frame bodies, thereby forming the another of the rail members, the another of the half-arm bodies and the another of the half-frame bodies into another module, and wherein the one module and the another module are assembled together to form the chassis framework.

2. The frame structure for an electric motorcycle according to claim 1, wherein the pair of half-frame bodies are coupled together, with a head pipe interposed therebetween.

3. A support structure for an electric motor provided on a chassis framework, wherein a bracket for a side kickstand is attached to the chassis framework, wherein the electric motor is supported by the chassis framework and the bracket for the side kickstand at three or more points around an output shaft of the electric motor, wherein the chassis framework is divided into two sections from a head pipe located at a front end of the chassis framework and extends obliquely downward towards a rear side of the chassis framework, wherein a periphery of a pivot center of right and left main frame parts of a pair of right and left half-frame bodies of the chassis framework forms a mounting space for the electric motor, wherein the electric motor is attached to the rear side of the chassis framework, wherein a substantially rear-half side of the electric motor is exposed to the outside in the proximity of the pivot center of the left main frame part, wherein the electric motor is attached to the left half-frame body, wherein the electric motor is supported by the left main frame part at support positions around a substantially front-half side of the electric motor, wherein the bracket extends rearwards from a rear edge of the chassis framework to support the substantially rear-half of the electric motor at a support position on a leading end of the bracket, wherein the support position of the bracket is located opposite to the support positions of the left main frame part with the output shaft of the electric motor disposed therebetween, wherein an inner surface of the left main frame part is provided with support parts which are spaced apart in a vertical direction so as to support the front side of the electric motor with respect to the output shaft, wherein a leading end of an arm part of the bracket is provided with another support part which supports the rear side of the electric motor with respect to the output shaft, wherein the front side of the electric motor is attached to the support parts of the left main frame part and the rear side of the electric motor is attached to the another support part of the bracket, and wherein a base end of the arm part of the bracket is fixed to a periphery of a rear edge of the left main frame part by bolts and the leading end of the arm part of the bracket is fixed to the electric motor such that the arm part bridges between the left main frame part and the electric motor.

4. The support structure for an electric motor according to claim 3, wherein the electric motor and the bracket are bolt-fastened from the inside of the chassis framework.

5. The support structure for an electric motor according to claim 3, wherein the electric motor is positioned at a substantially middle portion between a front wheel and a rear wheel, and the side kickstand is rotatably attached to a lower portion of the bracket.

6. The support structure for an electric motor according to claim 3, wherein the attachment position of the bracket on the chassis framework is in a projected surface of the electric motor, and is positioned below the center of a pivot.

7. The support structure for an electric motor according to claim 6, wherein the rear edge of the chassis framework is positioned in proximity to the attachment position of the bracket so that the bracket is exposed to the outside.

8. The support structure for an electric motor according to claim 3, wherein the chassis framework is formed from a cast material, and the bracket is formed from a forged material.

9. A frame structure for an electric motorcycle, comprising a chassis framework comprised of a pair of half-frame bodies, wherein an electric motor and an inverter through which a power is supplied from a battery to the electric motor are mounted to one of the half-frame bodies and are connected together via high-voltage cables before assembly of the chassis framework, thereby forming the electric motor, the inverter and the one of the half-frame bodies into one module, wherein the one module and another of the half-frame bodies are assembled together to form the chassis framework, wherein a seat rail comprised of a pair of rail members and a swing arm comprised of a pair of half-arm bodies are mounted in the chassis framework, wherein one of the rail members, one of the half-arm bodies, and a rear suspension are connected to the one of the half-frame bodies before the assembly of the chassis framework, thereby forming the electric motor, the inverter, the one of the rail members, the one of the half-arm bodies, the rear suspension and the one of the half-frame bodies into the one module, wherein another of the rail members and another of the half-arm bodies are mounted to the another of the half-frame bodies, thereby forming the another of the rail members, the another of the half-arm bodies and the another of the half-frame bodies into another module, and wherein the one module and the another module are assembled together to form the chassis framework.

* * * * *